Figure 1:
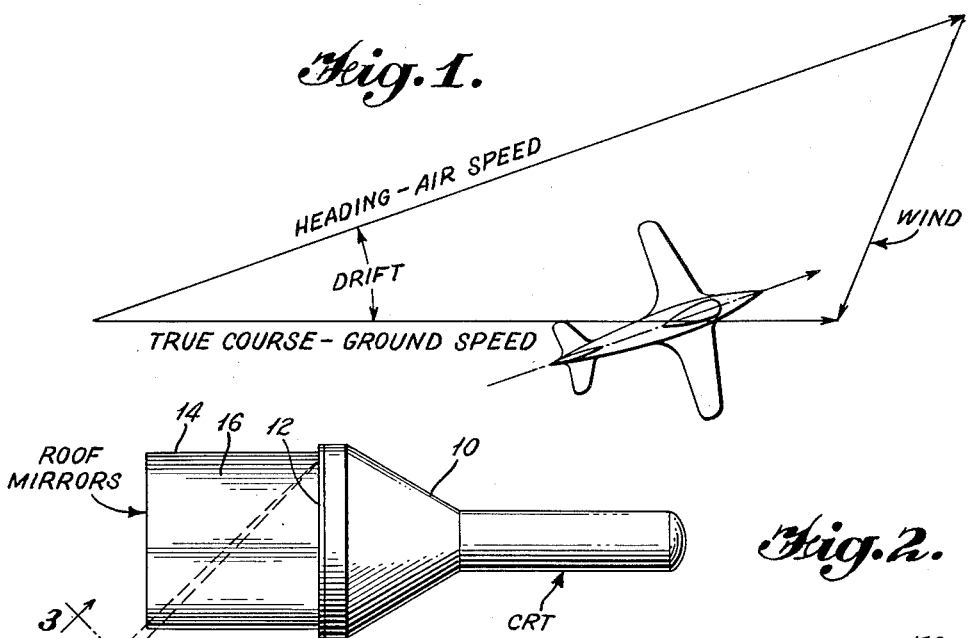

May 18, 1965  A. I. CHAPMAN, JR., ETAL  3,184,735
OPTICAL SYSTEM FOR AIRBORNE GROUND MAPPING RADAR APPARATUS
Original Filed July 7, 1958  5 Sheets-Sheet 1

INVENTORS
Aubrey I. Chapman, Jr.
and Bob E. Martel
BY
Stevens, Davis, Miller & Mosher
ATTORNEYS

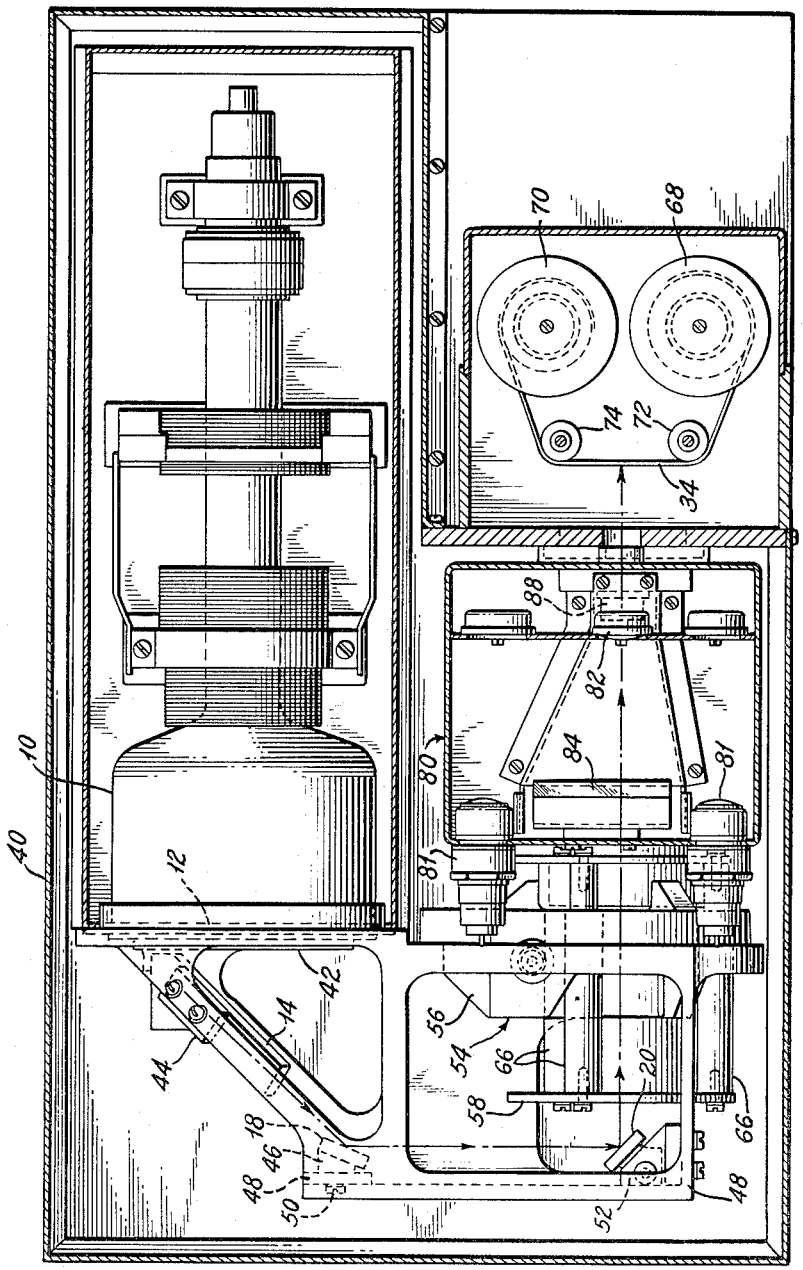

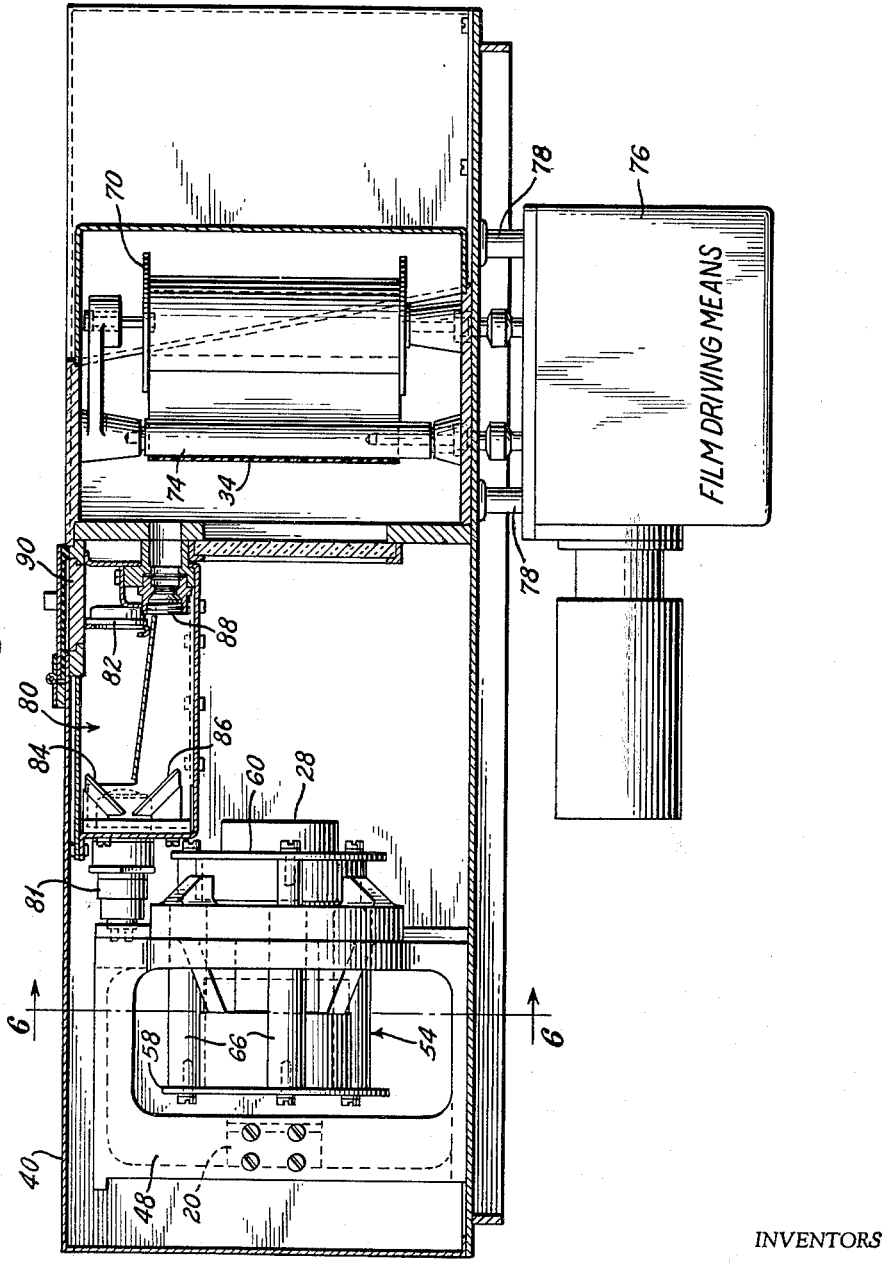

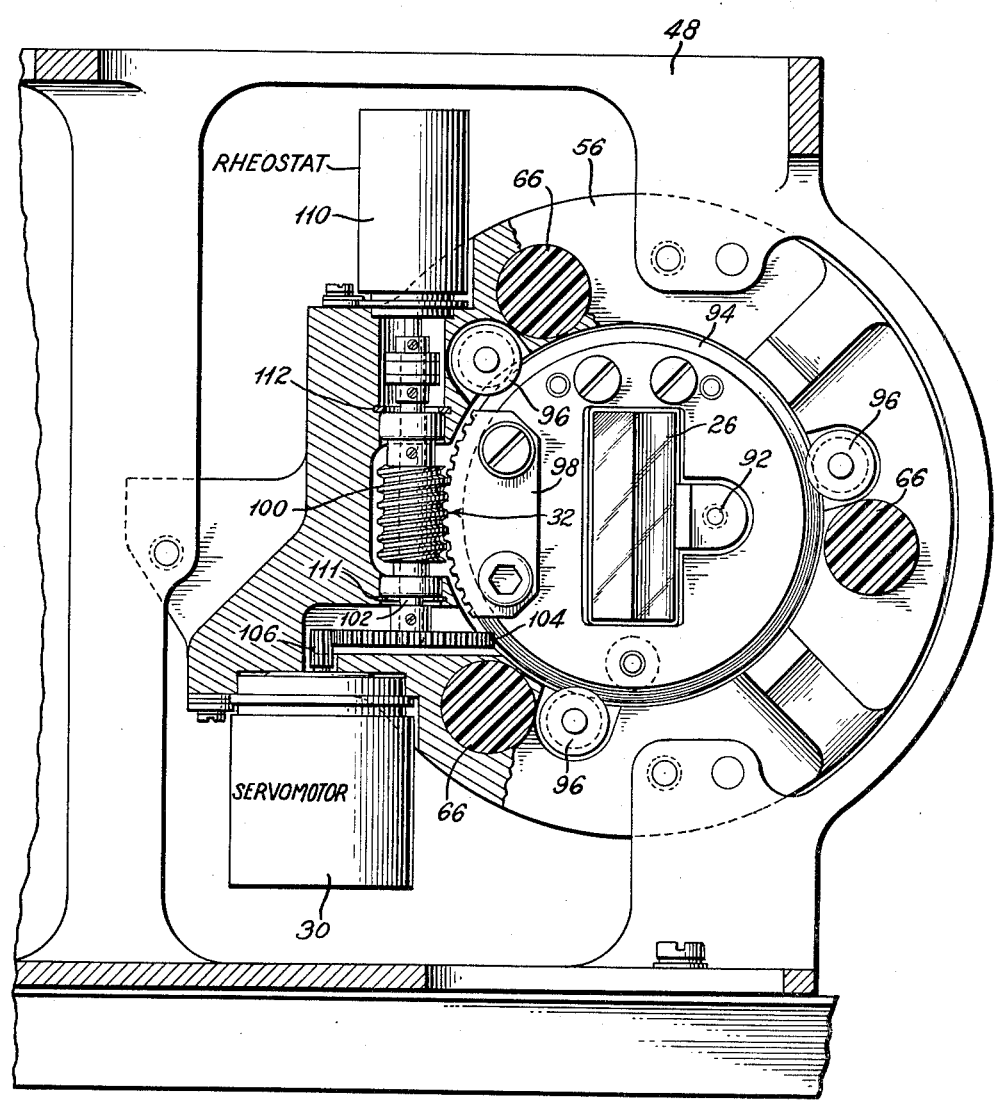

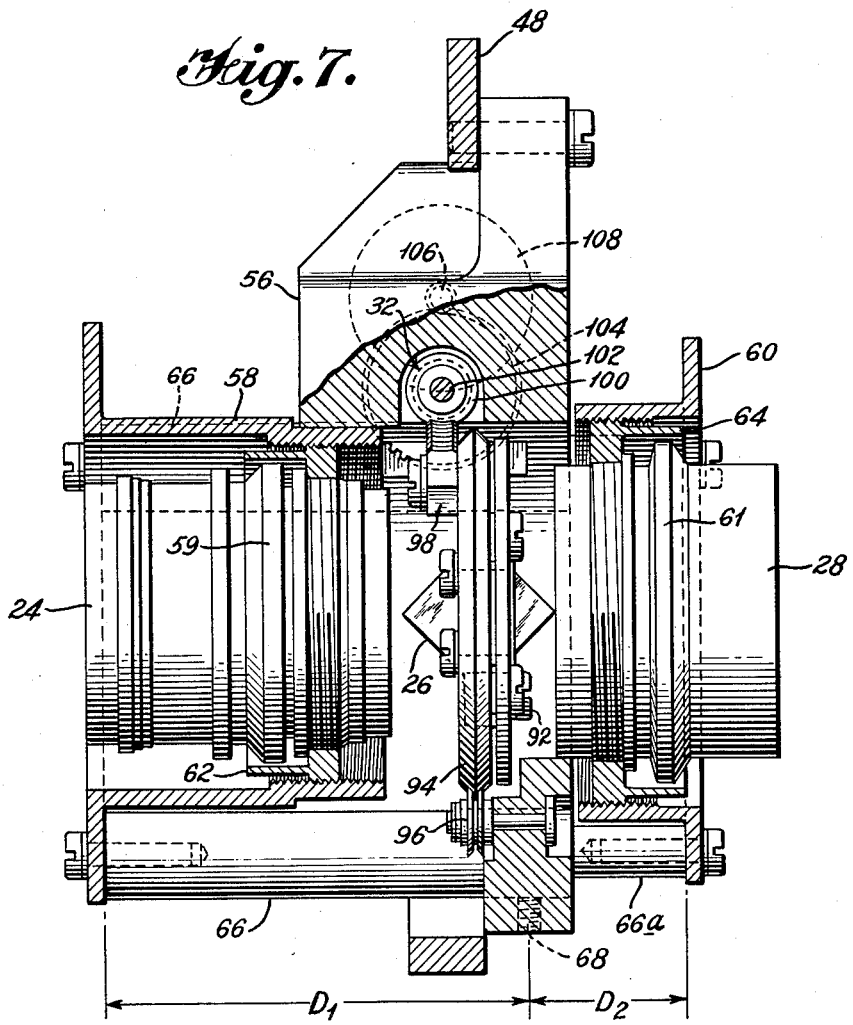

United States Patent Office 3,184,735
Patented May 18, 1965

3,184,735
OPTICAL SYSTEM FOR AIRBORNE GROUND
MAPPING RADAR APPARATUS
Aubrey I. Chapman, Jr., and Bob E. Martel, Dallas, Tex., assignors to Texas Instruments Incorporated, Dallas, Tex., a corporation of Delaware
Continuation of application Ser. No. 747,012, July 7, 1958. This application Oct. 9, 1962, Ser. No. 230,801
20 Claims. (Cl. 343—5)

This invention relates to improvements in an optical system for an airborne ground mapping radar apparatus. More particularly, this invention relates to an optical system for correcting aircraft drift in an airborner radar ground mapping apparatus.

Airborne radar ground mapping arrangements are known. In some forms of the known radar mapping devices a radar signal is received and displayed on the face of a cathode ray tube (CRT) or other display device and the displayed information may be suitably stored, as for example on a moving photographic film. In order to correctly store the information presented on the face of the CRT on the photographic film, it is desirable to orient the image to compensate for any drift of the aircraft from its heading. It is the principal object of this invention to photographically store the images presented on the face of a CRT in an airborne radar ground mapping apparatus after optically compensating for the drift of the aircraft.

Due to extreme variations of operating temperature encountered by the apparatus, with said temperature varies with the environment of the aircraft, any optical system utilizing precise spacing of lens assemblies is subject to distortion due to the expansion and contraction of the mounting means for these lens assemblies. In known devices, it has sometimes been the practice to provide heaters and the like for controlling the ambient temperature of the portion of the aircraft in which the apparatus operates in order to minimize any optical deviations caused by expansion and contraction of the optical system mountings with any temperature change.

The present invention eliminates the need for heaters and the like by mounting the lens assemblies on materials which have an optimum combination of expansion coefficients which compensate for expansion and contraction in the optical system when the aircraft is operating under adverse temperature conditions.

It is, therefore, an object of this invention to provide a lens assembly mount which will not be affected adversely by temperature variations.

It is a further object of this invention to photographically record auxiliary matters at the same time and on the same photographic film strip that records the information presented on the face of the CRT.

Still another object of the present invention is to provide an optical system for an airborne radar mapping device with substantially improved image resolution for a given-size cathode ray tube.

With these and other objects in view, the invention contemplates transferring the information displayed on the face of a CRT to a continuously moving photographic film through an optical system which incorporates a means for rotating the image to compensate for aircraft drift. In the preferred form of CRT display there are two traces corresponding to the radar-received signals from a pair of left and right fixed antennas. That is, the radar employs a pair of side-looking antennas that are fixed to the plane. The sweep is produced by the motion of the plane rather than by the motion of a scanning antenna. The traces are displayed on the CRT in parallel and time shared relation. The CRT trace speed is proportional to range and the received signals provide intensity modulation. A roof mirror assembly is provided and positioned such that each mirror reflects only one trace and the mirrors position the reflected image such that the traces appear to start at a common point and sweep outwardly therefrom in opposite directions. Thus, the optical path center line or the point common to both traces corresponds to zero ground range and the extremities of the traces correspond to maximum range left and right of the aircraft. A set of secondary mirrors are provided for changing the direction of the optical axis thereby reducing the physical size of the unit and allowing a more compact optical system. A lens-prism assembly is provided for inserting aircraft drift correction and for focusing the light from the CRT onto the film. This assembly consists of a collimating lens, a rotatable drift correction prism, and a focusing lens. The collimating lens parallels the light rays in its field of view which pass through the drift correction prism. The drift correction prism is a Dove prism, which prism has an optical characteristic of producing an angular rotation of an image about an optical axis when the prism is rotated; therefore the image may be rotated about its center line for compensation of aircraft drift. The rotated image, after leaving the prism, is focused by a second lens onto the film. The film is continuously driven at a speed corresponding to the ground speed of the aircraft. The lens assembly is mounted on a structure which compensates for temperature changes and expansion therefrom. This arrangement spaces the collimating and focusing lenses to hold the focus over a wide range of operating temperatures and thereby prevents degradation of the image on the film. An auxiliary camera is provided for recording auxiliary data such as time, heading or handwritten messages on a margin of the moving film.

Other advantages and objects of this invention will be apparent from the following detailed description taken in connection with the appended claims and with the accompanying drawings which disclose, by way of example, the principle of this invention and the best mode which has been contemplated of applying that principle.

Figure 2:
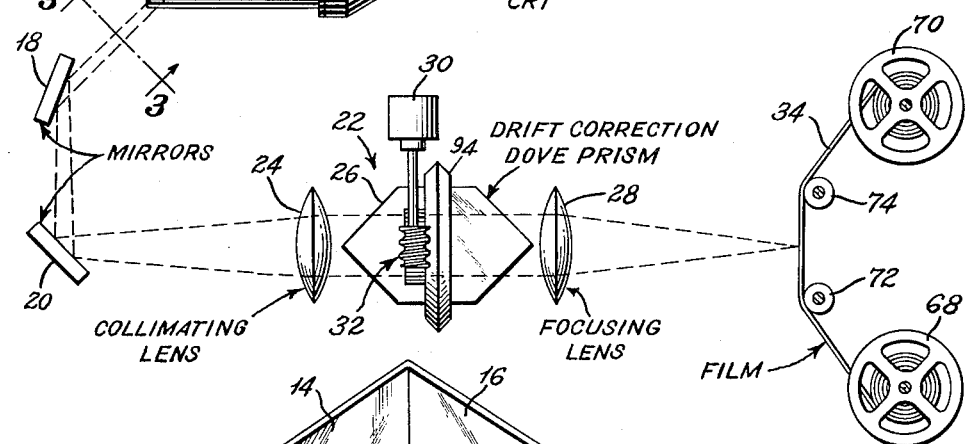
Figure 3:
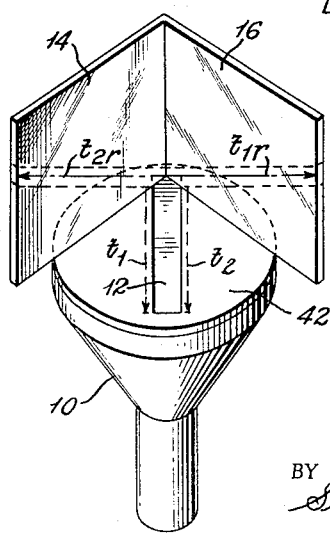

In the drawings:
FIG. 1 is a schematic illustration of aircraft drift showing the necessity for the drift correction afforded by the optical system of this invention;
FIG. 2 is a schematic view of the optical system of this invention;
FIG. 3 is a schematic view of the face of the CRT and the image reflected by the roof mirrors viewed generally along section line 3—3 of FIG. 2;
FIG. 4 is a top plan view of the apparatus of this invention with certain parts broken away and shown in section for clarity;
FIG. 5 is a side elevation view of the apparatus shown in FIG. 4 with certain parts broken away and others shown in section for clarity;
FIG. 6 is a detail view showing the mounting of the drift correcting prism and means for rotating this prism;
FIG. 7 is a detail view showing the lens assembly mounting and lens spacing supports.

Referring to FIG. 1, with the aircraft heading in the direction of the arrow labeled "heading" at a known air speed and with the wind blowing in the direction of the arrow labeled "wind," the aircraft will actually drift through the angle marked "drift" and the true course will be in the direction of the arrow marked "true course" at the ground speed. All this is well known in the navigation art. An aircraft which carries a ground mapping radar device will receive the radar signals and these received signals will be displayed by a display device in a manner well known in the art. The display device will display the information corresponding to the received radar signals in an orientation corresponding to the heading of the aircraft. Since it is desirable to record the displayed information on a photographic film, and it is also desirable to orient the information with regard to the true course while the film is moving in proportion to the ground speed, it is therefore necessary to orient the image of the display device with the true course. This invention provides an improved optical means for rotating the displayed image to an orientation corresponding to the true course of the aircraft thereby correcting for aircraft drift.

Referring now to FIGS. 2 and 3 for a schematic showing of the specific means embodied in this invention, there is shown a conventional cathode ray tube 10 adapted to display received information corresponding to received radar signals on its face 12. A pair of roof mirrors 14 and 16 are positioned such that each roof mirror reflects only part of the information displayed on the face of the CRT. In the preferred embodiment of CRT display there are two traces $t_1$ and $t_2$ corresponding to received signals from the left and right antennas on the aircraft. These traces are displayed in parallel and time shared relation and their sweep speed is proportional to range. The received signals provide intensity modulation. Each of the roof mirrors 14, 16 reflect only one of the traces and these roof mirrors are positioned such that when the traces are reflected the two traces appear to start at a common point and sweep outward in opposite directions. An optical mask 42 is used which actually covers the traces $t_1$ and $t_2$. However, the mask 42 is spaced from the screen of the cathode ray tube 10 and the roof mirrors 14 and 16 are positioned so that roof mirror 16 may look behind the mask 42 and view trace $t_1$ and roof mirror 14 may look behind the mask 42 and view trace $t_2$. The reflection from the roof mirrors viewed by the optical system is shown in FIG. 3, wherein trace $t_1$ is reflected at $t_{1r}$ and trace $t_2$ is reflected at $t_{2r}$. This system permits two full length sweeps on a single CRT, thereby producing twice the definition ordinarily possible with a single tube. That is, by the arrangement of the traces $t_1$ and $t_2$ in FIG. 3, a trace length substantially equal to the diameter of the CRT is possible rather than the customary trace length equal to the radius of the CRT as is customary in plan position indicator (P.P.I.) displays.

A pair of adjustable secondary mirror assemblies 18 and 20 are utilized to reflect the image and bend the optical path as shown in FIG. 2 thereby reducing the size of the optical system and allowing a more compact unit.

A lens-prism assembly indicated generally at 22 is utilized to correct for aircraft drift, and in the preferred embodiment this assembly consists of a collimating lens 24, a rotatable Dove prism 26 and a focusing lens 28. The collimating lens 24 views the image as reflected by the roof mirrors 14 and 16 and collimates the light beams into parallel rays. The Dove prism receives the image and, as is characteristic of Dove prisms when rotated about an axis parallel to the axis of the light, it will rotate the image at twice the angular velocity and therefore twice the angle that the prism itself is rotated. The image of the two traces may therefore be rotated about the point common to both of them to correct for the drift angle. Suitable means such as a servomotor 30 and a worm and gear sector arrangement 32 may be provided for rotating prism 26. The drift correction signal may be applied to the servomotor 30 by manual means or it may be applied by an automatic drift input means. After the image has been selectively rotated to correct for aircraft drift in the prism 26, the focusing lens 28 focuses the image on the moving photographic film 34 with the direction of the traces generally perpendicular to the movement of the film. This film is moved at a speed which is proportional to the ground speed of the aircraft.

The basic function of the lenses 24 and 28 is to focus the traces onto the film 34. However, the light rays entering the prism must be collimated because the Dove prism used for drift correction would disperse different colors if the entering light rays were not collimated. This dispersion would cause poor resolution.

Referring to FIG. 4 for a showing of the optical system described above in its structural environment, an enclosing housing 40, preferably made of aluminum, contains means for supporting a conventional cathode ray tube 10 having a face 12 upon which the traces corresponding to the received radar signals are displayed. A mask 42 having a rectangular opening is positioned in front of the face of the CRT and the roof mirrors 14 and 16 permitting the mirror 14 to reflect only the trace $t_2$ and the mirror 16 to reflect only the trace $t_1$ as shown in FIG. 3. The roof mirrors are mounted on an adjustable mounting assembly 44, attached to structural support 48. Whereas only a narrow portion of the roof mirrors 14 and 16 are actually in the optical path, FIGURE 4 shows mirror 14 as a narrow segment as opposed to the schematic showing of FIGURE 3 wherein mirrors 14 and 16 are large plates. Dotted lines indicate the portions of mirrors 14 and 16 shown in FIGURE 4.

The secondary reflecting mirror 18 is mounted on adjustable mount 46 and this mount is secured to the structural support 48 by suitable screw means 50. In a somewhat similar manner secondary mirror 20 is held in adjustable mount 52 which in turn is secured to the structural support member 48.

The collimating leans 24 and the focusing lens 28 are mounted in a common lens assembly 54 and this assembly in turn is attached to a mounting bracket 56 secured to the apparatus frame.

The lens assembly mount 54 includes a supporting bracket 58 for the collimating lens 24 and a supporting bracket 60 for the focusing lens, FIG. 7. The lens cases 59 and 61 holding lenses 24 and 28 are adjustably positioned within these brackets by means of suitable threaded bushings 62 and 64. The brackets 58 and 60 are spaced axially along the optical path by spacer rods 66 and reduced diameter extensions thereof 66a constructed of a suitable material having a suitable coefficient of expansion. One such suitable material is nylon. As mentioned previously, the housing 40 is preferably made of aluminum. Nylon has a coefficient of thermal expansion approximately five times that of the aluminum housing 40. A set screw is inserted at 68 in FIGURE 7 to fix the position of the nylon rods or spacers 66 and their extensions 66a with respect to the aluminum housing 40. The ratio of the distance between the point of attachment of the nylon rod 66 at 68 and the film 34 to the distance, indicated by $D_2$ in FIG. 7, that the spacer rods 66a extend toward the film 34 is made precisely the same as the ratio that the coefficient of thermal expansion for nylon bears to the coefficient of thermal expansion for aluminum. Thus, as the housing 40 expands thereby tending to move the film 34 away from the lens 28, the portion of the nylon rods from their point of attachment at 68 to their terminus of rods 66a expand the same distance and move the lens 28 toward the film 34 so that the face of the lens 28 maintains a constant distance from the film 34 and continues to focus the light on the film 34. In the same manner, the optical path between the face 12 of the cathode ray tube 10 and the point of attachment of the nylon rods 66 at 68 to the distance, indicated by $D_1$ in FIG. 7, along the optical path that the spacer rods 66 extend from their point of attachment at 68 toward the cathode ray tube 10 is made precisely the same as the ratio of the coefficient of thermal expansion of nylon to the coefficient of thermal expansion of aluminum. Because of the fact that nylon expands a greater amount than aluminum for a given temperature rise and because this greater amount of expansion is directly proportional to the distances involved, the distance from the space 12 of the cathode ray tube 10 to the face of the lens 24 is maintained constant. It should be noted that although the spacing between the two lenses 26 and 28 changes, this does not change the focus condition because the light between the lenses 26 and 28 is collimated.

The photographic film 34 is stored on reels 68 and 70. The film is taken off one of these reels and passed over a pair of rollers 72 and 74 thereby exposing a portion of the film to the image focused by the focusing lens 28. The film 34 may be driven at a speed corresponding or in proportional relationship to the ground speed of the aircraft by suitable driving means enclosed within housing 76 of FIG. 5. This housing is attached to the main housing enclosing the radar mapping system by means of suitable supports and attaching devices such as screws and spacers 78.

An auxiliary camera 80 may be utilized to record auxiliary data on the margin of the film. Such auxiliary data may, for example, take the form of aircraft bearing or heading, time, distance, and handwritten messages. As shown in FIGS. 4 and 5, the auxiliary camera may consist of one or more lights 81 to illuminate the desired data which may be displayed in a position 82 for recording photographically. The image of the device in position 82 is reflected by adjustable mirrors 84 and 86 and the image is focused by the data lens assembly 88 onto the upper margin of the film as seen in side view. The auxiliary camera may be provided with a removable cover 90 for easy access thereto.

As shown in detail in FIG. 6, the Dove prism is secured by suitable screw means 92 in a circular plate 94 having a bevelled periphery. This plate is rotatably journalled by roller-type supports 96 secured to bracket 56 at several points around the periphery of plate 92. The worm and gear sector arrangement 32 for rotating the prism consists of a gear sector 98 secured to the plate 94, which sector is meshed with a worm 100 secured to a drive shaft 102. Drive shaft 102 is restrained from movement along its axis by retaining rings 111 and 112 in supporting bracket 56. A drive gear 104 at one end of drive shaft 102 meshes with a pinion 106 on the drive shaft of a servomotor 30. An adjustable rheostat 110 may be provided at the other end of drive shaft 102 for producing a signal corresponding to the rotation of the prism. As can be seen in the preferred embodiment shown, the gear sector 98 allows rotation of the Dove prism 26 through only a limited angular range, however, since the prism has a double rotation characteristic, the rotation of the prism a maximum amount, for example, ±7½ degrees from a reference line will rotate an image twice this amount or ±15 degrees.

It is believed the operation of the device is apparent from the foregoing description. However, a brief summary of this operation is as follows: The radar-received signals are displayed on the face 12 of the CRT 10 in the form of parallel time shared traces $t_1$ and $t_2$. The roof mirrors 14 and 16 view the traces and the image is reflected by these mirrors. The two traces will appear to start at a common point and sweep outwardly in opposite directions as viewed in roof mirrors 14 and 16 and as shown in FIG. 3. The optical mask 42 selects only the desired views of the traces for the roof mirrors 14 and 16. The secondary mirrors 18 and 20 change the direction of the optical axis. The lens 20 collimates the light rays in its field of view into parallel beams which then pass through the drift correction prism 26. The drift correction prism is utilized to optically rotate the image of the two traces about a point common to both of them. The magnitude of this drift correction is selected by the aircraft pilot and is controlled by a positioning servo 30 through a gear arrangement 32 which orients the prism at proper angle. The focusing lens 28 then focuses the rotated image of the traces onto the film 34 which is moving at a speed corresponding to the ground speed of the aircraft. The lenses 24 and 26 are mounted in a temperature compensating mounting 56 to eliminate defocusing with the temperature changes encountered in the environment of the aircraft. Desired types of auxiliary data may be recorded on the margin of the moving film 34 by the auxiliary data camera 80.

This application discloses a preferred embodiment of an improved airborne radar mapping device having an optical system for inserting drift correction into the recording of the image displayed by a cathode ray tube. The described preferred embodiment is for the purposes of illustration only and various omissions, substitutions, and changes in form and details of the device illustrated and its operation may be made by those skilled in the art without departing from the spirit of the invention, as the invention is limited only by the scope of the appended claims wherein applicant is entitled to a reasonable range of equivalents.

What is claimed is:

1. An optical system comprising a cathode ray tube for displaying time-shared traces, and means for converting said time-shared traces into collinear alignment prior to imaging.

2. The system of claim 1, including means for recording said collinearly aligned traces.

3. The system of claim 2, including means for rotating said collinearly aligned traces.

4. The system of claim 3, wherein said rotating means are disposed between said converting means and said recording means.

5. The system of claim 1, wherein said converting means includes a roof mirror for each of said time-shared traces adjacent the face of said cathode ray tube for reflecting one of said traces and aligning said trace collinearly with the other of said traces.

6. The system of claim 5, including a mask disposed between the face of said cathode ray tube and said roof mirrors for pairing said one of said traces with one of said roof mirrors and the other of said traces with the other of said roof mirrors.

7. An optical system for an airborne radar mapping device comprising a cathode ray tube for displaying parallel line trace images representing received radar signals, means for converting said parallel line trace images into a single continuous line sweeping out from a central point, and means for recording said single continuous line.

8. The system of claim 7, including means for rotating said single continuous line to correct for aircraft drift.

9. The system of claim 7, wherein said converting means comprises a roof mirror for each trace adjacent the face of said cathode ray tube for reflecting a respective trace.

10. An airborne radar mapping device having an improved optical system comprising; a cathode ray tube for displaying a pair of parallel traces representative of received radar signals, a pair of roof mirrors disposed in front of the face of said cathode ray tube, each mirror reflecting only one trace, said mirrors being disposed such that said parallel traces on the face of said cathode ray tube are revolved to place them in a single line sweeping outward from a central point as reflected from said mirrors, a collimating lens in the optical path of said traces, an image rotating prism in the optical path of the collimated beam of said collimating lens, means to rotate said prism to rotate thereby the image about a point common to both traces, a focusing lens disposed on the side of said prism opposite said collimating lens for focusing the image of the rotated traces, and a movable photographic film disposed behind said focusing lens for recording photographically the traces displayed on the face of the cathode ray tube and viewed by said optical system after they have been revolved to correct for the drift of the aircraft by said prism.

11. A device as defined in claim 10 further comprising a plurality of elongated support devices for axially supporting said collimating lens and said focusing lens along the optical path, said support devices being constructed of a material having a relatively high coefficient of thermal expansion such that the extreme range of operating ambient temperatures encountered by said aircraft will have a negligible effect upon the focus of the optical system.

12. A device as defined in claim 11 further comprising an auxiliary camera for recording auxiliary data on the edge of said movable photographic film.

13. An optical system for an airborne radar mapping device comprising a cathode ray tube having an optical mask face for displaying a pair of time-shared parallel traces representing received radar signals from a pair of antennas, a roof mirror assembly including a pair of roof mirrors positioned such that each mirror reflects one trace displayed on the face of the CRT and said mirrors being mounted such that the parallel traces on the face of the CRT are optically revolved to make them appear to be sweeping outward from a central point in a single line as viewed by the optical system and as reflected from the mirrors, a further mirror assembly for bending the optical path of said reflected traces, a collimating lens viewing the traces and forming parallel light beams, a Dove prism in the optical path of the collimating beam, means mounting said Dove prism for rotation and means for rotating said prism, a focusing lens for receiving the image from the Dove prism, said focusing and collimating lenses sandwiching said Dove prism along the optical path, a device for mounting said lenses axially along said optical path, said device having a coefficient of thermal expansion higher than the coefficient of thermal expansion of the frame of the optical system to compensate for the thermal expansion of the frame and to preserve the focus in said optical system, a movable photographic film disposed in the optical path of said focusing lens for recording the images of the traces displayed on the face of the cathode ray tube photographically after they have been revolved to correct for the drift of the aircraft by said Dove prism, means for driving said photographic film at a speed proportional to the ground speed of the aircraft, and an auxiliary camera device for recording auxiliary data on said movable photographic film.

14. An optical system for an airborne radar mapping device, comprising; a cathode ray tube for displaying a parallel line trace image representative of received radar signals, mirror means for converting said parallel line trace image into a single continuous line image of double length, photographic means for photographically recording the single line image, optical means disposed between said single line image to correct for aircraft drift, said optical means comprising a Dove prism, means for rotating said prism, a collimating lens, and a focusing lens, said collimating lens receiving the displayed image, said Dove prism being inserted between said collimating lens and said focusing lens, and said focusing lens focusing the image on said photographic means.

15. An optical system for an airborne radar mapping device, comprising; a cathode ray tube for displaying an image representative of received radar signals, photographic means for photographically recording the displayed image, optical means disposed between said display device and photographic means for rotating said image to correct for aircraft drift, said optical means including a Dove prism, means for rotating said prism, a collimating lens and a focusing lens, said collimating lens receiving the displayed image, said prism being inserted between said collimating and focusing lens, said focusing lens focusing the image on said photographic means; and means responsive to changes in temperature for moving said collimating lens and said focusing lens along the optical axis to maintain the image in focus on said photographic means as the temperature varies.

16. An optical system for an airborne radar mapping device, comprising; a cathode ray tube for displaying an image representative of received radar signals, photographic means for photographically recording the displayed image, optical means disposed between said display device and photographic means for rotating said image to correct for aircraft drift, said optical means including a Dove prism, means for rotating said prism, a collimating lens and a focusing lens, said collimating lens receiving the displayed image, said prism being inserted between said collimating and focusing lens, said focusing lens focusing the image of said photographic means; and means responsive to changes in temperature for moving said collimating lens and said focusing lens along the optical axis to maintain the image in focus on said photographic means as the temperature varies, said means responsive to changes in temperature including nylon rods on which said collimating lens and said focusing lens are mounted.

17. An optical system for an airborne radar mapping device, comprising; a cathode ray tube for displaying an image representative of received radar signals, photographic means for photographically recording the displayed image, optical means disposed between said display device and photographic means for rotating said image to correct for aircraft drift, said optical means including a Dove prism, a rotatable holder upon which said Dove prism is mounted, a collimating lens and a focusing lens, said collimating lens receiving the display image, said prism being inserted between said collimating and focusing lens, said focusing lens focusing the image on said photographic means; means responsive to changes in temperature for moving said collimating lens and said focusing lens along the optical axis to maintain the image in focus on said photographic means as the temperature varies, and motor driven gear means for rotating said holder through a limited amount of angular rotation thereby rotating said Dove prism.

18. An optical system for an airborne radar mapping device, comprising; a cathode ray tube for displaying an image representative of received radar signals, photographic means for photographically recording the displayed image, optical means disposed between said display device and photographic means for rotating said image to correct for aircraft drift, said optical means including a Dove prism, means for rotating said prism, a collimating lens and a focusing lens, said prism being inserted between said collimating and focusing lens, said focusing lens focusing the image on said photographic means; an image displaying device consisting of the face of said cathode ray tube and further comprising a pair of roof mirrors each positioned to view separate portions of the face of said tube, and further, mirrors for bending the optical axis.

19. An optical system for an airborne radar mapping device, comprising; a cathode ray tube for displaying an image representative of received radar signals, photographic means for photographically recording the displayed image, optical means disposed between said display device and photographic means for rotating said image to correct for aircraft drift, said optical means including a Dove prism, means for rotating said prism, a collimating lens and a focusing lens, said prism being inserted between said collimating and focusing lens, said focusing lens focusing the image on said photographic means; said image displaying device consisting of the face of said cathode ray tube and further comprising a pair of roof mirrors each positioned to view separate portions of the face of said tube, and further mirrors for bending the optical axis, said image being displayed on the face of said tube in the form of two parallel time-shared traces and said roof mirrors being positioned to view said traces such that they will appear to start at a common center and sweep outwardly in the field of view of the optical system.

20. An optical system for an airborne radar mapping device, comprising; a cathode ray tube for displaying an image representative of received radar signals, photographic means for photographically recording the displayed image, optical means disposed between said display device and photographic means for rotating said image to correct for aircraft drift, said optical means including a Dove prism, means for rotating said prism, a collimating lens and a focusing lens, said prism being inserted between said collimating and focusing lens, said focusing lens focusing the image on said photographic means; an image displaying device consisting of the face of said cathode ray tube and further comprising a pair of roof mirrors each positioned to view separate portions of the face of said tube, and further mirrors for bending the optical axis, said image being displayed on the face of said tube in the form of two parallel time-shared traces and said roof mirrors positioned to view said traces such that they appear to start at a common center and sweep outwardly in the field of view of the optical system, said photographic means comprising a continuously moving photographic film driven at a speed proportional to the ground speed of the aircraft and further comprising an auxiliary camera device for recording auxiliary data on the same moving photographic film.

References Cited by the Examiner

UNITED STATES PATENTS

| 2,537,900 | 1/51 | Lee et al. | 88—57 |
| 2,836,816 | 5/58 | Allison et al. | 343—112 |
| 3,068,465 | 12/62 | Covely et al. | 343—5 |

FOREIGN PATENTS 620,519  3/49  Great Britain.

CHESTER L. JUSTUS, *Primary Examiner.*